June 4, 1929.  P. J. SHRUM  1,715,792
PROTECTOR
Filed Dec. 8, 1927

Inventor
Peter J. Shrum
Green & McCallister
Attorneys

Patented June 4, 1929.

1,715,792

UNITED STATES PATENT OFFICE.

PETER J. SHRUM, OF MONACA HEIGHTS, PENNSYLVANIA, ASSIGNOR TO COLONA MANUFACTURING COMPANY, A CORPORATION OF PENNSYLVANIA.

PROTECTOR.

Application filed December 8, 1927. Serial No. 238,700.

This invention relates to protectors and more particularly to protectors for the ends of pipes and the like.

An object of this invention is to provide a protector for pipe ends that shall strengthen the ends of such pipes and protect them from injury during handling and transportation.

Another object of this invention is to provide a protector that shall be adapted for use with either threaded ends or plain ends of pipes.

Another object of this invention is to provide a protector having a novel means for fastening it to the end of a pipe.

Other objects that may be made apparent throughout the further description of this invention are attained by means of the protector hereinafter described and illustrated in the accompanying drawings, wherein, Figure 1 is a sectional view of a protector embodying the invention disposed on the end of a pipe to be protected.

Figure 1:
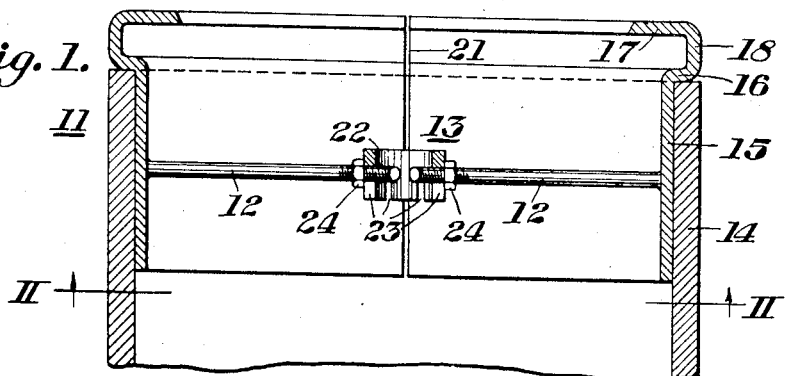
Figure 2:
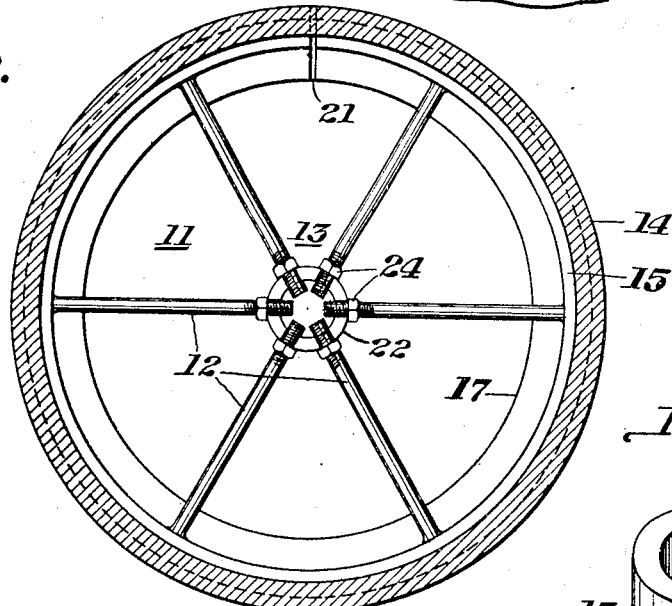
Fig. 2 is a sectional view taken along the line II—II of Figure 1.

The invention comprises in general a protector, represented in its entirety by 11, having a plurality of radially extending studs or bolts 12 disposed on its inner surface and means 13, associated with the studs or bolts 12 for releasably expanding the protector 11 and maintaining it in firm fixed relation with the end of a pipe 14.

This invention is illustrated and described in connection with a pipe having a plain end to be protected, however it will be obvious that this protector may be adapted for protecting the threaded end of a pipe.

The protector, as illustrated, is shown for use in connection with the end of a pipe and the internal portion adjacent to such end. The present protector, which is a cylindrical member, is preferably formed from a single piece of pipe and comprises a portion 15 having an external diameter substantially the same as the internal diameter of the pipe to be protected. The outer end of the protector is provided with an outwardly extending portion 16 for engaging and cooperating with the end of the pipe 14 and terminating in an inwardly extending flange portion 17. The flange portion 17 and the outwardly extending portion 16 being connected by a wall 18. The external diameter of the wall 18 is substantially the same or slightly greater than the external diameter of the pipe 14.

Figure 4:
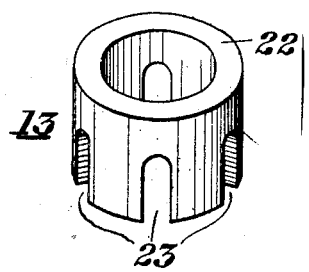
Fig. 4 is a perspective view of a detail embodying the invention.

The protector 11 is provided with a longitudinal slit 21 for permitting the means 13 to expand it outwardly against the inner walls of the pipe 14. The means 13 comprising a hub 22 (see Figure 4) having a plurality of slots 23 therein for receiving the studs or bolts 12. The studs or bolts 12 are provided with a threaded means 24 for cooperating with the hub 22 for expanding the protector.

Figure 3:
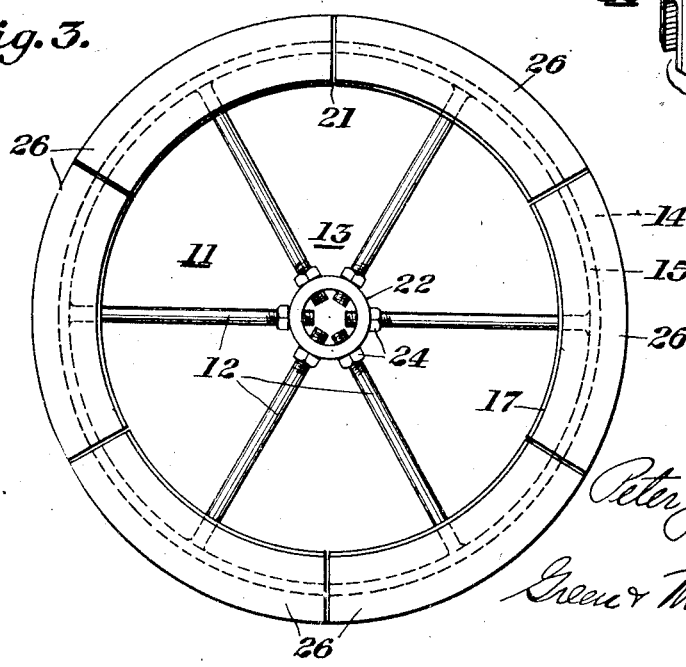
Fig. 3 is a top plan view showing a slightly different embodiment of the invention.

Figure 3 shows a slightly different embodiment of the invention wherein, the protector comprises a plurality of sections 26, each of the said sections being provided with a stud or bolt 12 for the same purpose for which the studs or bolts 12 are employed in Figure 1.

While I have illustrated and described certain embodiments of this invention, it will be apparent to those skilled in the art, that various changes, modifications, substitutions, additions and omissions may be made without departing from the spirit and scope of the appended claims.

What I claim as new and desire to secure Letters Patent on, is:

1. In a pipe or tube end protector, an annular portion adapted to bear upon the end of the pipe or tube to be protected, a relatively long annular flange secured to said annular portion and adapted to lie within the tube or pipe, said flange being split to permit expansion thereof and means located wholly within the space bounded by said flange for expanding the same into clamping engagement with the inner surface of said pipe or tube.

2. A device according to claim 1, in which the annular portion has double walls.

3. A device according to claim 1, in which the expanding means take the form of radial members threaded at their inner ends and provided with nuts which are adapted to bear against a central member.

4. A device according to claim 1, in which the expanding means take the form of radial members threaded at their inner ends and provided with nuts which are adapted to bear against a slotted, removable central member.

In testimony whereof, I have hereunto subscribed my name this 29th day of November, 1927.

PETER J. SHRUM.